United States Patent [19]
Willacy et al.

[11] Patent Number: 5,483,851
[45] Date of Patent: Jan. 16, 1996

[54] GEARBOX

[75] Inventors: Steven J. Willacy, Ilkley; David S. Mitchell, Bingley, both of United Kingdom

[73] Assignee: Lucas Industries public limited company, Solihull, England

[21] Appl. No.: 160,920

[22] Filed: Dec. 2, 1993

[30] Foreign Application Priority Data

Dec. 11, 1992 [GB] United Kingdom .................. 9225877

[51] Int. Cl.$^6$ .............................. F16H 35/06; F16H 57/02
[52] U.S. Cl. ........................ 74/606 R; 74/89.14; 74/399
[58] Field of Search ............................ 74/606 R, 89.14, 74/398, 399, 425

[56] References Cited

U.S. PATENT DOCUMENTS

| | | | |
|---|---|---|---|
| 2,348,392 | 5/1944 | Kester | 74/398 |
| 4,122,730 | 10/1978 | Weiland | 74/606 R |
| 5,020,385 | 6/1991 | Bader. | |

FOREIGN PATENT DOCUMENTS 04482392  9/1991  European Pat. Off. .

OTHER PUBLICATIONS

European Search Report completed Feb. 28, 1994 (2 pages).
European Search Report DE-A 34 17 699 (English language abstract).
European Search Report DE-A-23 12 395 (English language abstract).
European Search Report DE-A-31 40 330 (English language abstract).

Primary Examiner—Allan D. Herrmann
Assistant Examiner—Chong H. Kim
Attorney, Agent, or Firm—Trexler, Bushnell, Giangiorgi & Blackstone, Ltd.

[57] ABSTRACT

Thermal expansion within a gearbox causes relative motion of all of the component parts therein. For gearboxes having components made of different materials, differential thermal expansion may alter the clearances between meshing gears and give rise to increased backlash. The gearbox comprises a compensation member arranged to move one end of an axle having a first gear therein in response to changes to temperature so as maintain the first gear in substantially temperature invariant engagement with a second gear.

7 Claims, 4 Drawing Sheets

GEARBOX

The present invention relates to a gearbox.

It is known to make the housing of a gearbox from a relatively light material so as to reduce the weight of the gearbox. The gears and axles are made of hard wearing materials. Thus the gears and the housing are often made of different materials and consequently have different coefficients of thermal expansion. In some circumstances the engagement between the gears may be selected to allow for the different rates of thermal expansion whilst still maintaining acceptable clearances and loadings between the gears with changes in the temperature of the components of the gearbox. However, a problem arises if it is required to use the gearbox over a range of temperatures while maintaining the clearance between the gears at a substantially constant low or zero value, for example, to obtain zero backlash.

U.S. Pat. No. 4,693,130 discloses a gearbox comprising a central toothed wheel driving toothed pinions mounted on shafts. The shafts are provided with magnetic bearings, whose magnetic force is controlled by sensors which sense the radial position of the central wheel. The position of the pinion shafts can be controlled to compensate for centrifugal and thermal expansion.

DE 3417699 discloses a gearbox in which compensating rods are inserted within telescoping shafts of the gearbox so as to eliminate axial play in the bearings as a result of thermal expansion of the housing of the gearbox.

FR 2659792 discloses an annular compensation member for accommodating axial expansion of the gearbox shafts.

According to the present invention there is provided a gearbox, comprising a housing, a first gear mounted on a first axle, a second gear mounted on a second axle supported by the housing, and a compensation member attached at a first portion thereof to the housing, the compensation member and at least one of the gears having a coefficient of thermal expansion different from that of the housing, the first axle being supported at a first position by a first support substantially fixed with respect to a first part of the housing and at a second position by a second support cooperating with the compensation member such that the second support is urged to move by the compensation member in response to a change of temperature to maintain the first and second gears in substantially temperature invariant engagement.

Preferably the material of the housing has a coefficient of thermal expansion greater than that of the materials of the at least one gear and the compensation member. The housing may, for example, be made of aluminium. Advantageously the first and second gears and axles may be made of a stronger material, such as steel. Preferably the compensation member is made of a material having a relatively small coefficient of thermal expansion, such as steel.

Preferably the second axle is perpendicular to, and not in the same plane as, the first axle. Preferably the first gear comprises a helically threaded cylinder or worm gear. The second gear may be circular and have teeth around all or part of a circumference thereof. Alternatively a part circular toothed member may be provided on the second axle for cooperating with the first gear to provide limited rotation. As further alternatives the first and second gears may be cylindrical spur gears, or bevel gears, or one gear may be a straight rack and the other may be a spur gear or a part circular gear.

Preferably the second support is attached to a second end of the compensation member.

In a first embodiment, a first end of the compensation member may be attached to the housing at a point substantially on the opposite side of the axis of the second axle to the first support. Thus if the longitudinal axis of the second axle lies within a plane that is parallel to the longitudinal axis of the first axle, then the first end of the compensation member is attached to the housing at a point on the opposite side of the plane to the first axle. As the temperature of the gearbox increases, the housing expands more than the gears and the first support moves away from the plane. The second support moves toward the plane due to expansion of the housing causing movement of the first end of the compensation member, however, the displacement of the second support may be less than the displacement of the first end of the compensation member, due to thermal expansion of the compensation member. In some embodiments, depending on the geometry of the gearbox and the coefficients of thermal expansion of the materials used, the second support may be moved away from the plane by the compensation member. Careful positioning of the gears enables these two relative motions to maintain the gears in correct engagement. Furthermore the thermal expansion of the gears can be accommodated.

In a second embodiment, a first end of the compensation member is attached to the housing at a point such that the first end and the second support are on the same side of the plane which is parallel to the longitudinal axis of the first axle and in which the longitudinal axis of the second axle lies. The compensation member may be arranged to hold the second support substantially against movement in a direction parallel to the longitudinal axis of the first axle. A surface of the second support may be arranged to slide over a corresponding surface of the housing such that expansion of the housing causes relative movement of the second support towards the plane.

In a variant of the second embodiment, the second support may be held by a support member arranged to pivot about a pivot point attached to the housing. Advantageously the pivot only permits rotation of the support member about an axis perpendicular to a plane containing the longitudinal axis of the first axle and a notional line extending perpendicularly from the first axle to the point of engagement of the first and second gears. Thus rotation of the support member about the pivot moves the second support in a direction so as to vary the distance between the first and second axles along the notional line which is perpendicular to the first axle and which passes through the point of engagement of the first and second gears. The support member is also attached to the compensation member. The differential expansion between the compensation member and the housing causes the support member to rotate about the pivot. This movement allows the position of the second support to vary so as to maintain the gears in temperature invariant engagement.

The first axle may be supported at the first support on bearings. Advantageously the bearings permit a limited angular deviation of the axle from its nominal axis without damage.

The present invention will further be described, by way of example, with reference to the accompanying drawings, in which.

Figure 1:
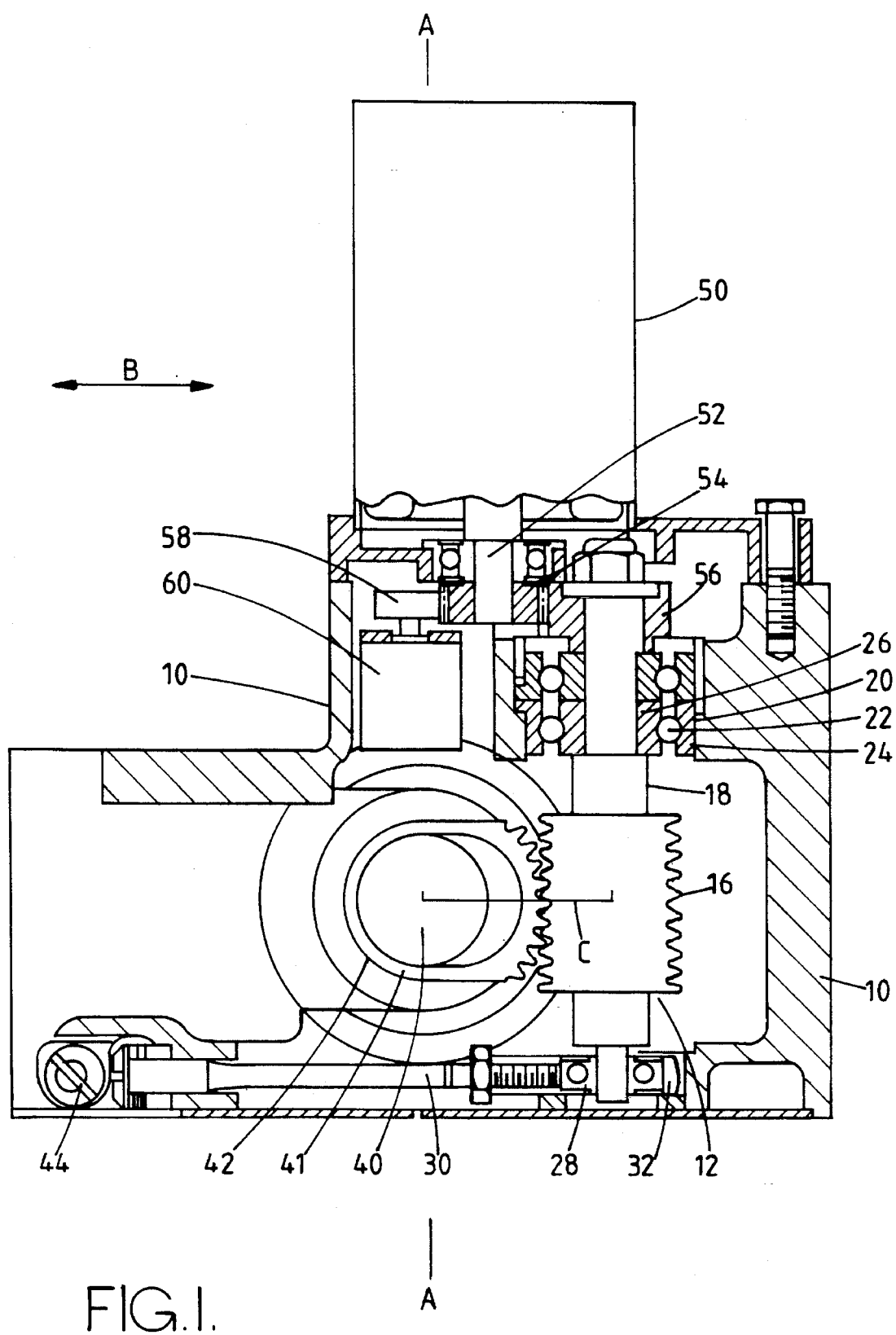
FIG. 1 shows a cross-section of a low backlash gearbox constituting a first embodiment of the invention.

The gearbox of FIG. 1 comprises a housing 10 supporting a first gear 12 and a second gear 14. The first gear 12 comprises a helically threaded cylinder 16 carried on, and substantially co-axial with, a first axle 18. The first axle 18 is rotatably supported towards a first end by a first bearing 20 comprising a plurality of ball bearings 22 held within inner and outer ball races 24 and 26, respectively. The first bearing 20 holds the first end of the first axle 18 securely against lateral movement with respect to the housing 10 whilst allowing a limited angular deviation of the axle 18. The second end of the first axle 18 is rotatably supported by a second bearing 28. The second bearing is attached to a second end of a compensation member 30. The second bearing is supported within a recess 32 in the housing 10 which permits limited movement of the second bearing 28 parallel to the axis of the compensation member 30, but which substantially prevents movement parallel to the axis of the first axle 18. Advantageously movement perpendicular to a first plane containing the axes of the first axle 18 and the compensation member 30 (i.e. the first plane is parallel to the plane of the cross-section in FIG. 1) may also be limited by the recess 32. The first axle 18 has a portion of increased diameter between the first and second bearings 20 and 28 which holds the first axle 18 against axial displacement relative to the housing 10.

The second gear 14 is supported on a second axle 40 having a longitudinal axis perpendicular to the first plane. The second axle 40 is rotatably supported by bearings (above and below the plane of the cross-section of FIG. 1 and omitted for clarity) attached to the housing 10. A toothed member 42 is secured to the second axle 40 and engages the helical thread of the cylinder 16. Thus rotation of the first axle causes rotation of the second axle. As shown, the teeth of the toothed member 42 can only engage the helical thread of the cylinder 16 over a limited range of rotation of the second axle. Thus the second axle can only be driven over a limited angular range. Alternatively the toothed member 42 may be circular so as to permit unlimited rotation of the second axle. The second axle 40 extends outside the housing 10 and acts as an output shaft.

A first end of the compensation member 30 is secured to the housing at a point 44 lying on the opposite side of a second plane to the first axle 18, the second plane being parallel with the axis of the first axle 18, perpendicular to the first plane and containing the longitudinal axis of the second axle 40. The second plane is perpendicular to the plane of FIG. 1 and contains the line A—A.

The gearbox of FIG. 1 is suitable for use in an actuator. An electric motor 50 is attached to the housing 10. A third gear 54 is fixed to an output shaft 52 of the motor 50, and engages a fourth gear 56 attached to the first end of the first axle 18. The third gear 54 also engages a fifth gear 58 attached to an input shaft of a rotary position transducer 60.

Rotation of the output shaft 52 of the motor 50 is transmitted to the first axle 18 via the third and fourth gears 54 and 56, respectively. The cylinder 16 rotates with the first axle 18 and causes the second axle 40 to rotate via the first and second gears 12 and 14, respectively. The position transducer provides a position signal representing the rotational position of the motor output shaft 52 and hence of the output shaft of the gearbox.

If the gear box is subjected to an increase in temperature, the casing 10 expands to a greater extent than the first and second gears 12 and 14. Expansion in a direction parallel to the arrow B moves the first end of the first axle 18 away from the second plane (A—A), that is in a rightwards direction as shown in FIG. 1, and would tend to separate the first and second gears from one another in a conventional gearbox. However the expansion also moves the first end of the compensation member 30 away from the second plane (A—A), that is leftwards as shown in FIG. 1. The coefficient of linear thermal expansion of the material of the compensation member 30 is less than that of the material of the housing 10. By careful selection of materials and the length of the compensation member, the displacement of the second end of the first axle 18 with increasing temperature can be modified such that thermal expansion along a line C representing the distance between the axes of rotation of the first and second axles and passing through the engaging portions of the first and second gears 12 and 14 matches that of the expansion of the first and second gears themselves. Thus the engagement between the gears 12 and 14 is maintained and is substantially unaffected by temperature.

Figure 2:
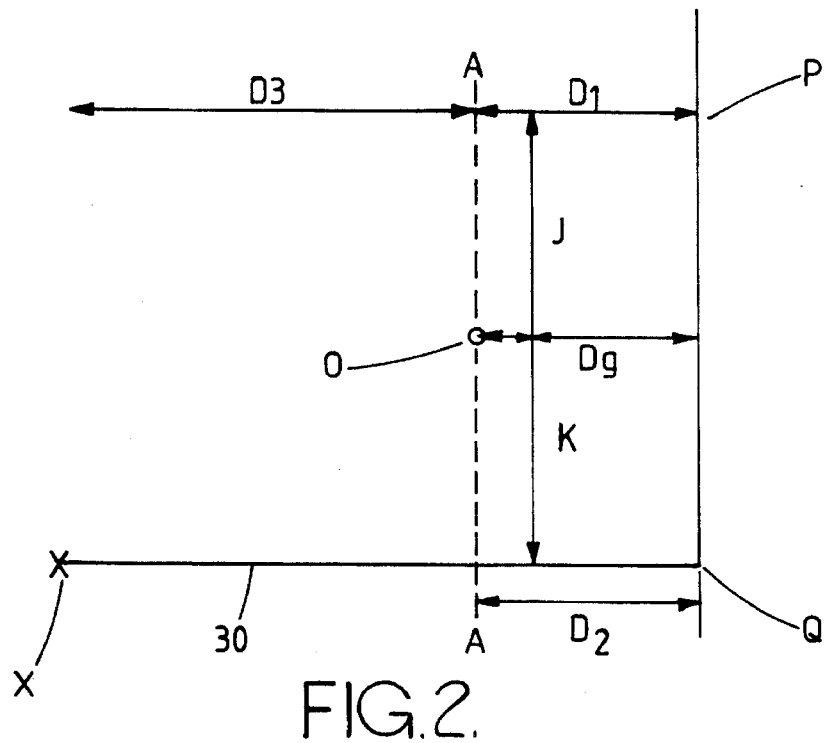
FIG. 2 is a diagram showing the relative positions of the axles, gears and compensation member of the gearbox of FIG. 1.

FIG. 2 is a diagram illustrating the relative positions of the elements of the gearbox of FIG. 1 at a first temperature. "O" represents the axis of the second axle 40 lying in the second plane. "P" represents the first bearing 20 at the first end of the first axle 18 and "Q" represents the second bearing 28 at the second end of the first axle. The first and second bearings are displaced from the second plane by a distance D1 and D2, respectively. The first end of the compensation member 30 is attached to the housing at "X", a distance D3 from the second plane. "J" and "K" represent the distances parallel to the first axle from the midpoint of engagement of the first and second gears to the first and second bearings, respectively, of the first axle. Dg represents the distance between the axes of the first and second axles along a line passing through the mid-point of engagement of the first and second gears.

At the first temperature D2=D1, Dg=D1 and the length of the compensation member 30 is D2+D3. If the gear box is subjected to a temperature rise $\Delta T$ to temperature T2 and the coefficient of expansion of the case is Ca and the coefficient of expansion of the gears and compensation member is Cs, then:

$$D1'=D1\ (1+Ca\Delta T) \qquad (1)$$

where the ' superscript indicates the expanded value at T2. The gears also expand. The difference in expansion causes the gears to move apart if Ca>Cs. In order to maintain the engagement between the gears, the distance Dg' must be controlled, such that:

$$Dg'=D1\ (1+Cs\Delta T) \qquad (2)$$

so as to compensate for the expansion of the gears. This may be achieved by suitable movement of the second end of the first axle. Dg' can be expressed in terms of D1', D2', J and K, thus:

$$Dg'=D1'.K/(J+K)+D2'.J/(J+K) \qquad (3)$$

If J is substantially equal to K (as shown in FIG. 2) the expression simplifies to:

$$Dg'=(D1'+D2')/2. \qquad (4)$$

Thus the value of D2' to maintain engagement between the gears can be found. Furthermore D2' can be expressed in terms of the expansion of the compensation member 30 and the movement of the point of attachment X.

$$D2'=D2(1+Cs\Delta T)+D3(Cs-Ca)\Delta T \quad (5)$$

where D2=D1.

A knowledge of the coefficients of thermal expansion of the materials and the geometry of the supports enables calculation of the length of the compensation member (D2+D3) required to maintain the gears in substantially temperature invariant engagement at the expense of a small but acceptable angular displacement of the first axle.

The relative values of the distances J and K may also be selected to further refine or vary the displacement of the second end of the first axle in order to obtain a satisfactory engagement of the gears over a wide temperature range.

Figure 3:
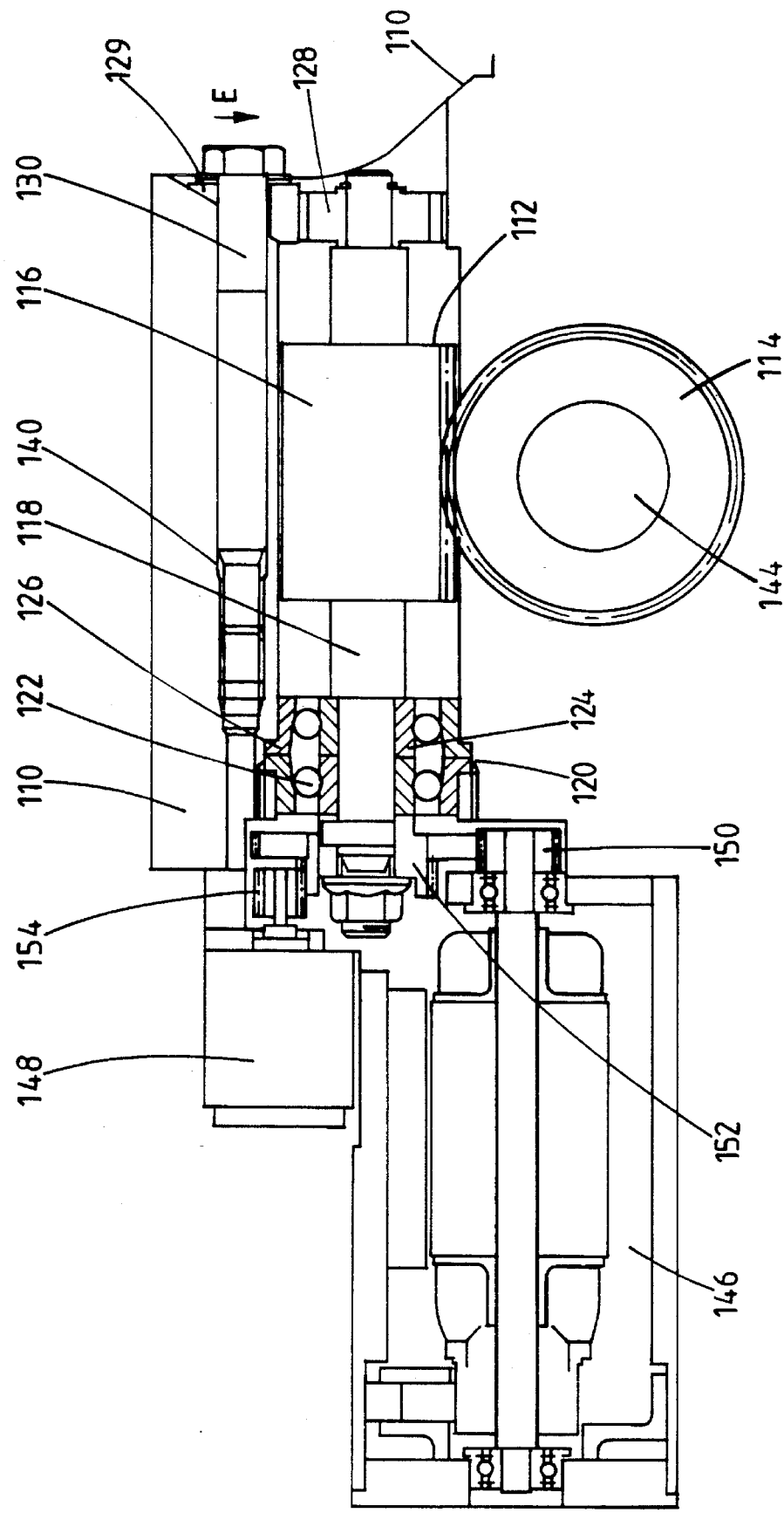
FIG. 3 is schematically illustrates a second embodiment of a low backlash gearbox constituting a second embodiment of the invention.

FIG. 3 shows a second embodiment of a low backlash gear box. A housing 110 supports a first gear 112 and a second gear 114. The supports for the second gear are omitted from FIG. 3 for clarity. The first gear 112 comprises a helically threaded cylinder 116 carried on, and co-axial with, a first axle 118. The first axle 118 is rotatably supported towards a first end by a first bearing 120 comprising a plurality of ball bearings 122 held within inner and outer ball races 124 and 126, respectively. The first bearing holds the first end of the first axle 118 securely with respect to the housing 110. The second end of the first axle is rotatably supported by a second bearing 128 cooperating with a support 129. The support 129 has a bore 132 through which the second end of compensation member 130 extends. A clearance exists between the compensation member 130 and the bore 132 and is sufficient to allow the support 129 to move parallel to the arrow "E". A restraining portion 133 at the second end of the compensation member 130 holds the support 129 in engagement with the housing 110. The compensation member 130 is held within a passage 140 formed in the housing 110 and is substantially parallel to the first axle 118. A first end of the compensation member 130 is attached to the housing 110 at a point adjacent the first bearing 120.

The second gear 114 is supported in the housing 110 on a second axle 144 in a manner similar to that described for the first embodiment. Similarly a motor 146, a position transducer 148, and third, fourth and fifth gears 150, 152 and 154, respectively, are provided in a manner similar to that described for the first embodiment.

Figure 4:
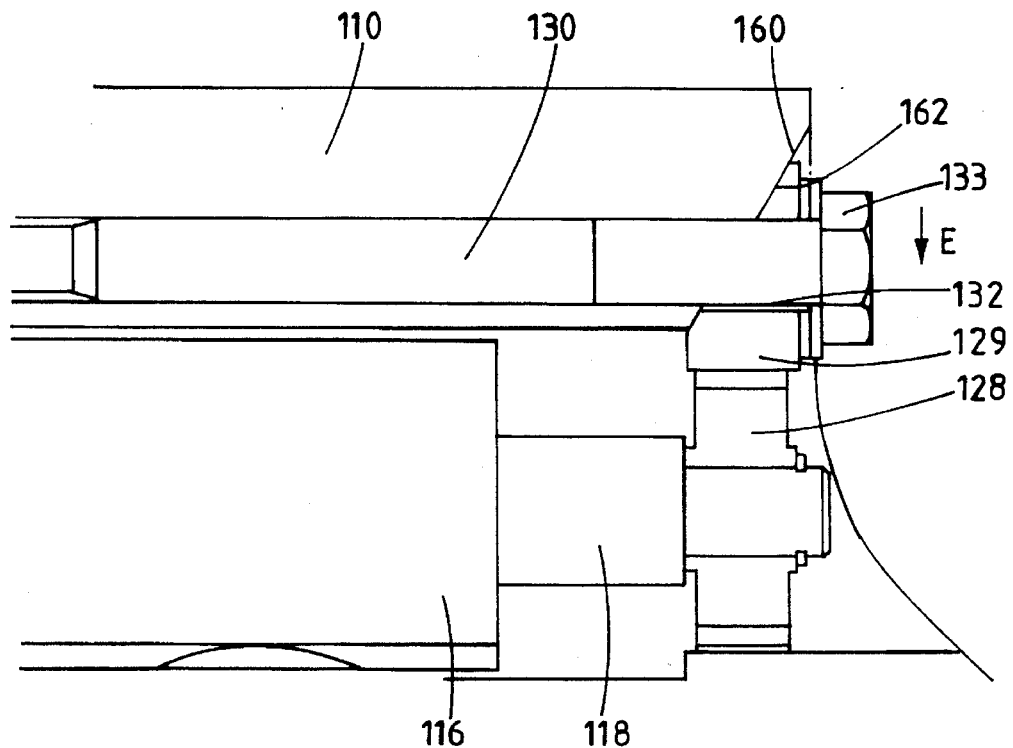
FIG. 4 shows part of the gearbox of FIG. 3 in greater detail.

The housing 110 has a face 160 inclined with respect to the longitudinal axis of the compensation member 130, as shown in FIG. 4. The face 160 may be planar, but preferably defines part of a cylindrical surface so as to hold the support 129 against movement perpendicular to the plane of the cross-section shown in FIG. 4. The support 129 has a matching surface 162.

The bearing 128 is held in contact with the support 129 by virtue of the first and second gears being in engagement such that a force exists between the gears acting to separate them, and thereby urging the second end of the first axle towards and into engagement with the support 129. The interface between the bearing 128 and the support 129 may be profiled so as to prevent relative displacement between the bearing 128 and the support 129 in a direction perpendicular to the plane of the cross-section shown in FIG. 4. Alternatively the bearing 128 may be secured to the support 129.

An increase in temperature causes the housing 110 to expand and to move the first gear 112 away from a plane that contains the longitudinal axis of the second axle 144 and which is parallel to the longitudinal axis of the first axle 118.

The coefficient of linear thermal expansion of the housing 110 is greater than that of the compensation member 130. The differential expansion on warming causes an increase in the forces acting between the surfaces 160 and 162, which in turn generate a correcting force acting in the direction of the arrow "E". The correcting force causes the support 129 to move so as to reduce the forces between the surfaces 160 and 162, thereby moving the second end of the first axle in the direction of the arrow E. Thus the second end of the first axle moves so as to keep the first and second gears in substantially temperature invariant engagement at the expense of a slight but acceptable angular displacement of the first axle.

Cooling of the gearbox reduces the forces acting between the faces 160 and 162. The second end of the first axle may then move in a direction opposite that of the arrow E in response to urging from the gears.

Figure 5:
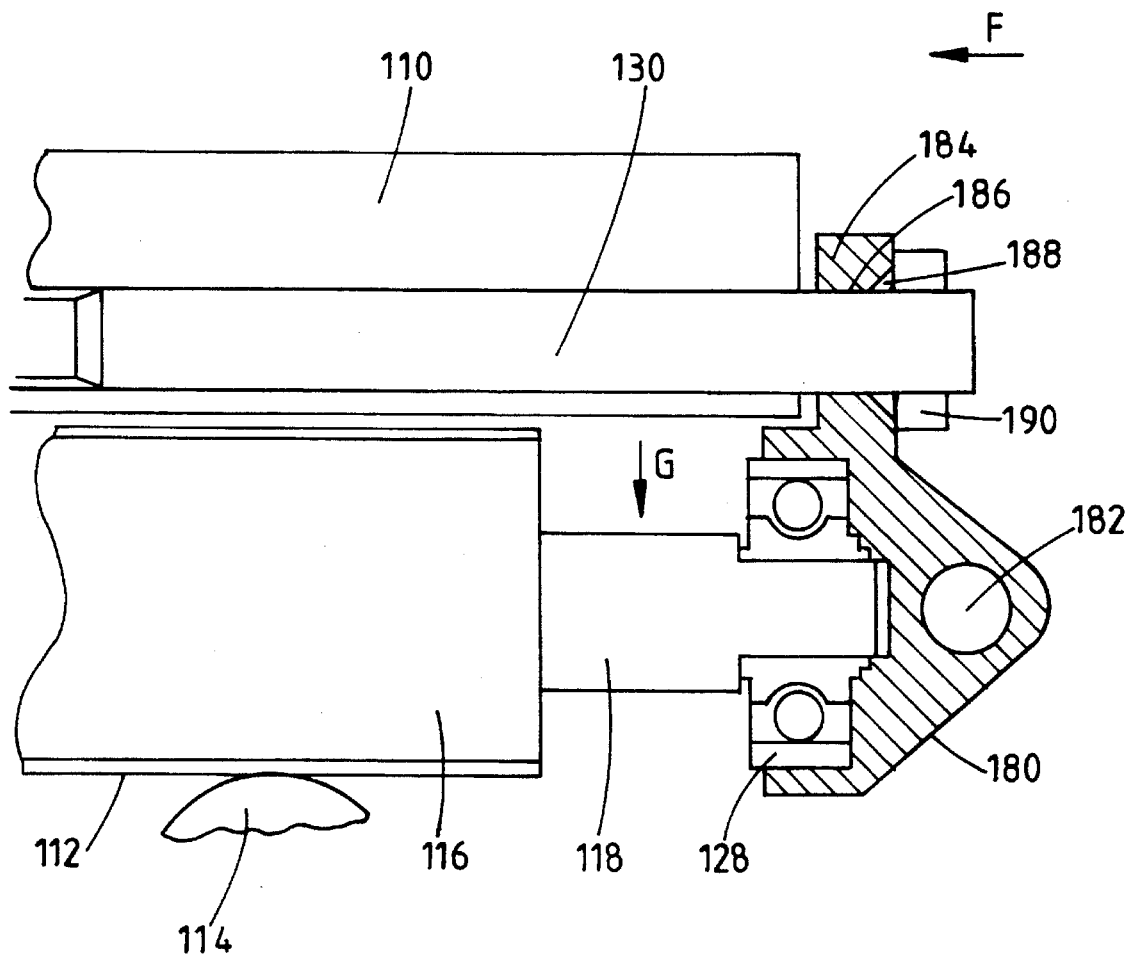
FIG. 5 shows an alternative to the arrangement shown in FIG. 4.

An alternative arrangement to the support 129, as illustrated in FIGS. 3 and 4, is shown in FIG. 5. The second bearing 128 is held by a support 180 which is mounted on a pivot 182 which is attached to the housing 110 (for example by means of projections on the housing above and below the plane of the drawing). The attachments between the pivot and the housing have been omitted for clarity. The bearing 128 is a self aligning bearing and allows the limited rotation of the support 180 about the pivot 182 to be accommodated. The support 180 has an arm 184 formed with a bore 186 through which the compensation member 130 extends. The bore 186 has a conically counterbored region 188 facing outwardly. A nut 190, having a spherical bearing engaging the region 188, threadedly engages with the compensation member 130 so as to provide a force acting along the direction of arrow F which is converted by the pivoted support 180 to a force acting along the direction of arrow G to hold the gears 112 and 114 in engagement.

An increase in temperature causes the housing 110 to expand and to move the first gear 112 away from engagement with the second gear 114, since the pivot 182 is moved away from a plane which is parallel to the longitudinal axis of the first axle 118 and which contains the longitudinal axis of the second axle 144 (See, for example, the second axle 144 as shown in FIG. 3). The differential thermal expansion between the housing and the compensation member 130 causes the compensation member to expand less than the housing and thereby to cause relative movement of the arm 184 along the direction of arrow F, thereby rotating the support 180 in an anti-clockwise direction about the pivot. Such motion moves the bearing 128 along the direction of arrow G, thereby moving the first gear towards the second gear. Thus the motion of the support 180 can be used to move the first gear so as to compensate for the effects of expansion and contraction of the housing 110.

It is thus possible to provide a gearbox where changes in temperature do not substantially affect the engagement between the gears. Furthermore, each axle is firmly held by the housing at least one point, giving rise to a simple but robust and effective gearbox.

We claim:

1. A gearbox, comprising a housing having a first part, a first gear, a first axle, first and second axle supports, a second gear, a second axle and a compensation member, said first axle and said compensation member each having first and second portions, and said compensation member and at least one of said first and second gears having a coefficient of thermal expansion different from that of said housing, the material of said housing having a coefficient of thermal expansion greater than those of the materials of said at least one gear and said compensation member in which: said first gear is mounted on said first axle; said second gear is mounted on said second axle and said second axle is supported by said housing; said compensation member is attached at said first portion thereof to said housing; said first axle is supported at said first portion thereof by said first axle support so as to be substantially fixed with respect to said first part of said housing and is supported at said second portion thereof by said second axle support; and said second axle support is arranged to cooperate with said second portion of said compensation member such that said second axle support is urged to move by said compensation member in response to a change in temperature to maintain said first and second gears in substantially temperature invariant engagement.

2. A gearbox as claimed in claim 1 which said first and second axles have respective longitudinal axes and in which said longitudinal axis of said second axle is substantially perpendicular to and non-intersecting with said longitudinal axis of said first axle.

3. A gearbox as claimed in claim 1, in which said first gear is a worm gear.

4. A gearbox as claimed in claim 1, in which said first and second axles have respective longitudinal axes and said longitudinal axis of said second axle defines a plane which is parallel with said longitudinal axis of said first axle, said second axle support and said first portion of said compensation member being on the same side of said plane.

5. A gearbox as claimed in claim 1, which said compensation member is substantially parallel with said first axle.

6. A gearbox as claimed in claim 5, in which said second axle has a longitudinal axis, said gearbox further comprising moving means for converting relative motion between said second portion of said compensation member and said housing due to differential thermal expansion into motion of said second support so as to move said second portion of said first axle in a plane substantially perpendicular to said longitudinal axis of said second axle.

7. A gearbox as claimed in claim 6, in which said second support is pivotally attached to said housing and is connected to said compensation member such that the relative motion causes said second support to rotate.

* * * * *